United States Patent
Saga (10) Patent No.: US 6,678,220 B1
(45) Date of Patent: Jan. 13, 2004

(54) INFORMATION RECORDING APPARATUS

(75) Inventor: Hideki Saga, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 623 days.

(21) Appl. No.: 09/583,480

(22) Filed: May 31, 2000

(30) Foreign Application Priority Data

Jun. 2, 1999 (JP) .......................................... 11-154652

(51) Int. Cl.⁷ ............................................... G11B 7/00
(52) U.S. Cl. ................................................. 369/44.27
(58) Field of Search .......................... 369/47.53, 53.31, 369/44.27, 44.29, 112.23

(56) References Cited

U.S. PATENT DOCUMENTS

| | | | |
|---|---|---|---|
| 5,070,495 A | * 12/1991 | Bletscher et al. | 369/47.52 |
| 5,699,336 A | * 12/1997 | Maeda et al. | 369/53.18 |
| 5,848,045 A | * 12/1998 | Kirino et al. | 369/47.53 |
| 5,936,924 A | * 8/1999 | Tanaka | 369/47.52 |
| 5,956,295 A | * 9/1999 | Yamakawa et al. | 369/13.24 |
| 5,978,333 A | * 11/1999 | Kobayashi et al. | 369/44.41 |

FOREIGN PATENT DOCUMENTS

| | | | |
|---|---|---|---|
| JP | 1292603 A | 11/1989 | |
| JP | 5298737 A | 11/1993 | |

* cited by examiner

*Primary Examiner*—William Korzuch
*Assistant Examiner*—Kimlien T. Le
(74) *Attorney, Agent, or Firm*—Kenyon & Kenyon

(57) ABSTRACT

An information recording apparatus includes an energy generation device for generating recording energy; a position control device for controlling a position of irradiation on the recording medium with an output of the energy generation device; a drive device for driving the energy generation device; a switching device for switching information based on user data and test information to supply the two kinds of information selectively to the drive device; a reading device for reading the marks recorded on the recording medium; an evaluation device for evaluating a reproduced signal obtained by the reading device; and a recording condition control device for controlling a recording condition on the basis of an evaluation result obtained by the evaluation device, wherein, when the marks used for recording the test information are to be reproduced, controlling operation of the position control device is changed to be different from that used for recording the test information.

6 Claims, 10 Drawing Sheets

INFORMATION RECORDING APPARATUS

BACKGROUND OF THE INVENTION

1. Field of the Invention

The present invention relates to an information recording apparatus for recording information by a local physical change in a recording medium due to energy irradiation, and exclusively relates to an optical disk device.

2. Description of the Related Art

Currently available optical disk-medium and device combinations can be roughly classified into a combination of magneto-optical disks and a magneto-optical disk device of the type of forming a mark by a reversal magnetic domain on a recording layer by heating the recording layer, and a combination of phase-change disks and an optical disk device of the type of forming a mark by an amorphous domain on a recording layer while changing the cooling speed of the recording layer by controlling the quantity of recording energy input at heating. As an example of a method for improving recording density of information to be recorded on such recording media, there is a method in which marks holding information are reduced as a whole and, at the same time, the distance between adjacent marks is shortened. In either type, it is, however, essential that the mark shape is controlled accurately. That is, if the mark length along a scanning direction of optical spot (tracking direction) is too short, jitter of a reproduced signal increases so that reliability of reproduced information cannot be secured. If the mark length along the tracking direction is contrariwise too long, jitter of the reproduced signal also increases. If the mark width along a direction perpendicular to the scanning direction (perpendicular to tracks) of optical spot is too narrow, the amplitude of the reproduced signal decreases so that reliability of reproduced information cannot be secured. If the mark width in the perpendicular direction is contrariwise too wide, crosstalk in reproduction process with respect to adjacent tracks increases so that reliability of reproduced information cannot be secured and, accordingly, there is a risk of cross-erase that adjacent recorded marks may be destroyed when things come to the worst. As described above, there is an important theme in terms of improvement of recording density of such recording media that a mark holding is formed into a desired shape (length and width) which is neither too large nor too small.

It is, however, very difficult to form stably and accurately a small mark having a size not larger than about a half of the optical spot size when the mark is to be reduced in size for the sake of high-density recording. This is because such a small mark cannot but be formed stably in a spatially gentle temperature gradient portion which is near a peak temperature portion among temperature rise portions of the recording layer by the optical spot. Hence, the peak temperature in a recording mode varies for every mark because of the change of the temperature of the recording layer before recording energy irradiation and the change of the intensity of recording energy. That is, the effective recording sensitivity of the recording layer varies. As a result, the mark shape varies greatly. In the case of an optical disk of the type of controlling the mark shape by recording energy intensity waveform, the peak temperature of the recording layer is apt to vary particularly due to variation of thickness of the recording layer of the recording medium and in accordance with the recording pattern. Reduction of the diameter of the optical spot by use of a short wavelength laser light source is direct to solve the aforementioned problem. Reduction of the wavelength of a semiconductor laser diode which is a typical laser light source is, however, attended with technical difficulty. Hence, there is the existing state of affairs that no technique has satisfied the demand for increase of recording density.

To solve these problems, in JP-A-5-298737 (hereinafter referred to as a first related art), a test-write zone is provided on a recording medium so that a signal reproduced from marks recorded in the test-write zone is evaluated for the purpose of forming small marks by the same optical spot stably and accurately. That is, when recording is performed while recording power is changed, leading and trailing edges of a mark shift in reverse directions along a tracking direction. The first related art asserts that the recording condition (especially, recording power) can be optimized when the length of the mark in the tracking direction is detected by use of the aforementioned technique.

In JP-A-1-292603 (hereinafter referred to as a second related art), for the same purpose as that of the first related art, a magneto-optical recording medium is heated periodically and intermittently by light pulses at regular intervals and, at the same time, a magnetic field applied to the heated region is inverted at a high speed. That is, the direction of magnetization of the approximately circular heated region can be determined in accordance with heat by every light pulse. Hence, when this operation is repeated while the heated position is shifted along the tracking direction, the direction of magnetization of a crescent-shaped domain can be substantially determined in accordance with heat by every light pulse. The second related art asserts that the mark length in the tracking direction and the mark width in a direction perpendicular to the tracking direction can be controlled independently so that a very small mark compared with the diameter of the optical spot can be formed stably regardless of the mark width.

The first related art, however, utilizes the characteristic of so-called "light intensity modulation method" in which the mark shape is determined only by a heating procedure by means of an optical spot. That is, the phenomenon that leading and trailing edges of each mark shift in reverse directions when recording is performed while recording power is changed is peculiar to the light intensity modulation method. The first related art cannot be applied to a "magnetic field modulation method" or a "laser-strobe magnetic field modulation method" in which leading and trailing edges of each mark shift by the same distance in the same direction along the tracking direction even in the case where recording is performed while recording power is changed. Moreover, substantially in the first related art, the shifting of the leading and trailing edges of the mark caused by the change of recording power is merely detected but the mark width is not detected directly. Accordingly, it was difficult to control the mark width accurately, that is, to determine recording power accurately. Hence, it was impossible to perform recording/reproduction using small marks at narrow track intervals, so that the first related art was disadvantageous in terms of improvement of recording surface density.

In the second related art, a very small mark compared with the diameter of the optical spot can be formed and, at the same time, the mark width and the shortest mark length can be changed individually. This effect is however effective only on magneto-optical recording media. Moreover, the conventional test-write method as disclosed in the first related art cannot be used in the second related art because leading and trailing edges of each mark shift by the same distance in the same direction along the tracking direction even in the case where recording is performed while recording power is changed, as described above. Hence, it was impossible to control the mark width sufficiently, so that it was difficult to reduce the track pitch.

For the aforementioned reason, in the respective related art, it was therefore impossible to form small marks with sufficient accuracy, so that it was impossible to improve recording surface density.

SUMMARY OF THE INVENTION

An object of the present invention is to provide an information recording apparatus capable of forming marks carrying information with a shape desired to enhance recording areal density.

According to an aspect of the present invention, there is provided an information recording apparatus for recording information on a recording medium by supplying the recording medium with energy to form marks different in physical property from non-recorded portions, comprising: a recording energy generation device for generating recording energy; a position control device for supplying an output of the recording energy generation device to a desired position on the recording medium; a drive device for driving the energy generation device; a switching device for switching information based on user data and test information to supply these two kinds of information selectively to the drive device; a reading device for reading the marks recorded on the recording medium; an evaluation device for evaluating a reproduced signal obtained by the reading device; and a recording condition control device for controlling a recording condition on the basis of an evaluation result obtained by the evaluation device, wherein, when the marks used for recording the test information are to be reproduced, controlling operation of the position control device is changed to be different from that used for recording the test information.

With the aforementioned configuration, the mark width can be detected directly to optimize the recording condition. By the recording condition optimizing operation, variation of the mark shape caused by variation of recording sensitivity of the recording medium due to variation of thickness of the recording layer of the recording medium or variation of the environmental temperature can be reduced as extremely as possible. At the same time, variation in the operating characteristic of the apparatus for performing recording can be reduced. Hence, a very small mark can be formed extremely accurately, so that improvement of recording surface density can be achieved.

DESCRIPTION OF THE EMBODIMENTS

Embodiments of the present invention will be described below. Although description will be made on the assumption that the present invention is applied to a magneto-optical disk device using a light intensity modulation method, it does not limit the shape of the recording medium and the recording method as a subject of the present invention. That is, the medium may be shaped like a tape, a card, etc., and the recording method may be a magnetic field modulation method or a laser-strobe magnetic field modulation method other than the light intensity modulation method. Further, the following description does not intend to limit the recording principle, and the gist of the present invention is also effective for an information recording apparatus based on phase-change recording, or the like. That is, the present invention can be generally applied to information recording apparatuses for recording information by energy irradiation of a recording medium to bring a local physical change of the recording medium.

Figure 1:
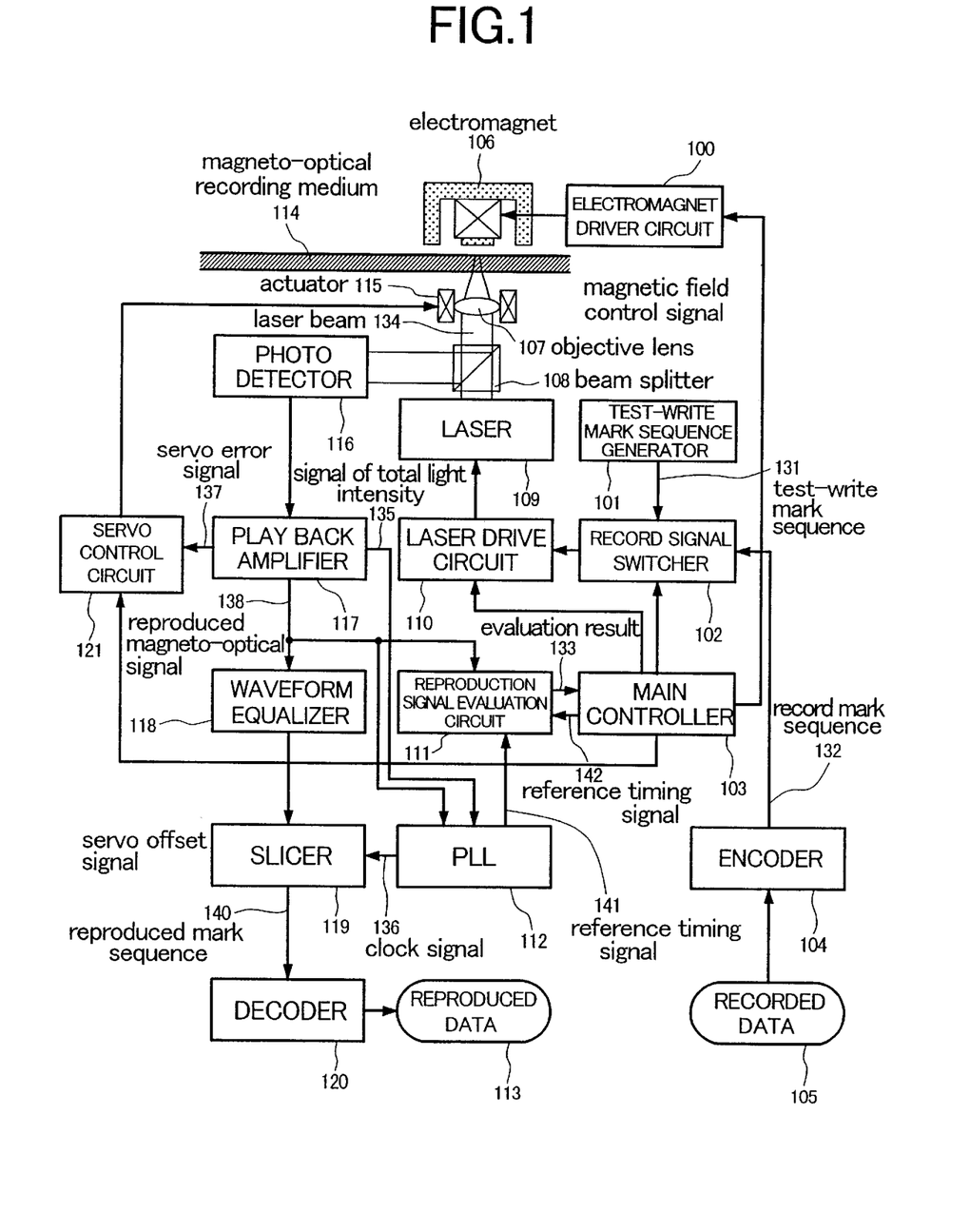
FIG. 1 is a diagram showing an example of the configuration of an information recording apparatus according to the present invention.

FIG. 1 is a diagram showing an example of the configuration of an information recording apparatus according to the present invention. In the apparatus, respective blocks are controlled by a main controller 103. The main controller 103 issues instructions concerning recording power to a laser drive circuit 110, instructions concerning input selection to a recording signal switcher 102, instructions concerning magnetic field applying direction to an electromagnet drive circuit 100 and instructions concerning servo condition (focusing displacement from focus point, focusing on/off, polarity of tracking, tracking displacement from track center, tracking on/off, etc.) to a servo control circuit 121. In an information reproducing mode, a laser beam 134 scans marks (not shown) and embossed pits (not shown) on a magneto-optical recording medium 114. Light reflected at the magneto-optical recording medium 114 is led to a photo detector 116 via an objective lens 107 and a beam splitter 108. The photo detector 116 converts the intensity distribution and polarization component of the reflected light into electric signals proportional to the intensity thereof. In a playback amplifier 117, these signals are further converted into a focusing error signal, a tracking error signal, a signal of total light intensity 135 and a reproduced magneto-optical signal 138. The focusing error signal and the tracking error signal form a servo error signal 137 which indicates the position of an optical spot. The servo error signal 137 is given to a servo control circuit 121. Hence, the position of the objective lens 107 is controlled by an actuator 115 so that the optical spot for recording/reproduction can scan a desired position with a suitable size on the magneto-optical recording medium 114. In an ordinary information recording mode, recording data 105 which is user data is converted, by an encoder 104, into a record mark sequence 132 corresponding to a mark sequence formed on the magneto-optical recording medium 114. The encoder 104 has a modulation rule according to (1, 7) modulation. The record mark sequence 132 is transmitted to a laser drive circuit 110 through a record signal switcher 102. In the laser drive circuit 110, the record mark sequence 132 is converted into a laser drive current corresponding to the laser emission waveform, so that a laser 109 which is a recording energy source is made to emit light. The laser beam 134 emitted from the laser 109 is converged onto the magneto-optical recording medium 114 via the beam splitter 108 and the objective lens 107 to heat a recording layer (not shown) to thereby form a mark. In this mode, a recording magnetic field in a predetermined direction is applied to the position of convergence of the laser beam 134 by an electromagnet 106. In an ordinary information reproducing mode, marks on the magneto-optical recording medium 114 are scanned by a laser beam 134 which is so low in level as not to destroy the marks. A reproduced magneto-optical signal 138 corresponding to the presence/absence of a mark in an optical spot scanning position on the magneto-optical recording medium 114 is subjected to a waveform equalizing process by a waveform equalizer 118 and further converted into a reproduced mark sequence 140 by a slicer 119. At the same time, a PLL 112 generates a clock signal 136 on the basis of the signal of total light intensity signal 135 and the reproduced magneto-optical signal 138. The slicer 119 uses the clock signal 136 as a reference timing signal for restoring the reproduced magneto-optical signal to the reproduced mark sequence 140. Finally, a decoder 120 decodes reproduced data 113 by performing the inverse of the encoder 104 with reference to the reproduced mark sequence 140 and issues the reproduced data 113 to the outside. In an information erasing mode, the laser 109 emits light continuously to heat the magneto-optical recording medium 114 continuously to the recording temperature or higher. At the same time, an erasing magnetic field in a direction reverse to the direction in the information recording mode is generated by the electromagnet 106, and applied to the position of convergence of the laser beam 134. In a test-write recording mode, a magnetic field in the same direction as that in the ordinary information recording mode is applied to the magneto-optical recording medium 114, and the actuator 115 moves the optical spot position into a predetermined test-write zone (not shown) provided on the magneto-optical recording medium 114. Then, an operation different from that in the ordinary information recording mode is carried out as follows. A test-write mark sequence 131 generated by a test-write mark sequence generator 101 is given, in place of the record mark sequence 132, to the laser drive circuit 110. Hence, the test-write mark sequence 131 is recorded while the recording condition (recording power, focusing displacement from a focus point in the recording mode and tracking displacement from a center track in the recording mode) is changed in accordance with the instructions of the main controller 103. The test-write mark sequence 131 thus recorded is reproduced in the same manner as in the ordinary information reproducing mode. A reproduced magneto-optical signal 138 which is a signal reproduced from the test-write mark sequence 131 is evaluated by a reproduction signal evaluation circuit 111. An evaluation result 133 from the reproduction signal evaluation circuit 111 is given to the main controller 103. A reference timing signal 141 or 142 indicating timing required for evaluation is supplied from the PLL 112 or the main controller 103 to the reproduction signal evaluation circuit 111 as occasion demands. The main controller 103 compares the recording condition with the evaluation result 133 of the reproduced magneto-optical signal 136, determines an optimum recording condition and controls respective portions of the apparatus on the basis of the optimum recording condition.

Figure 2:
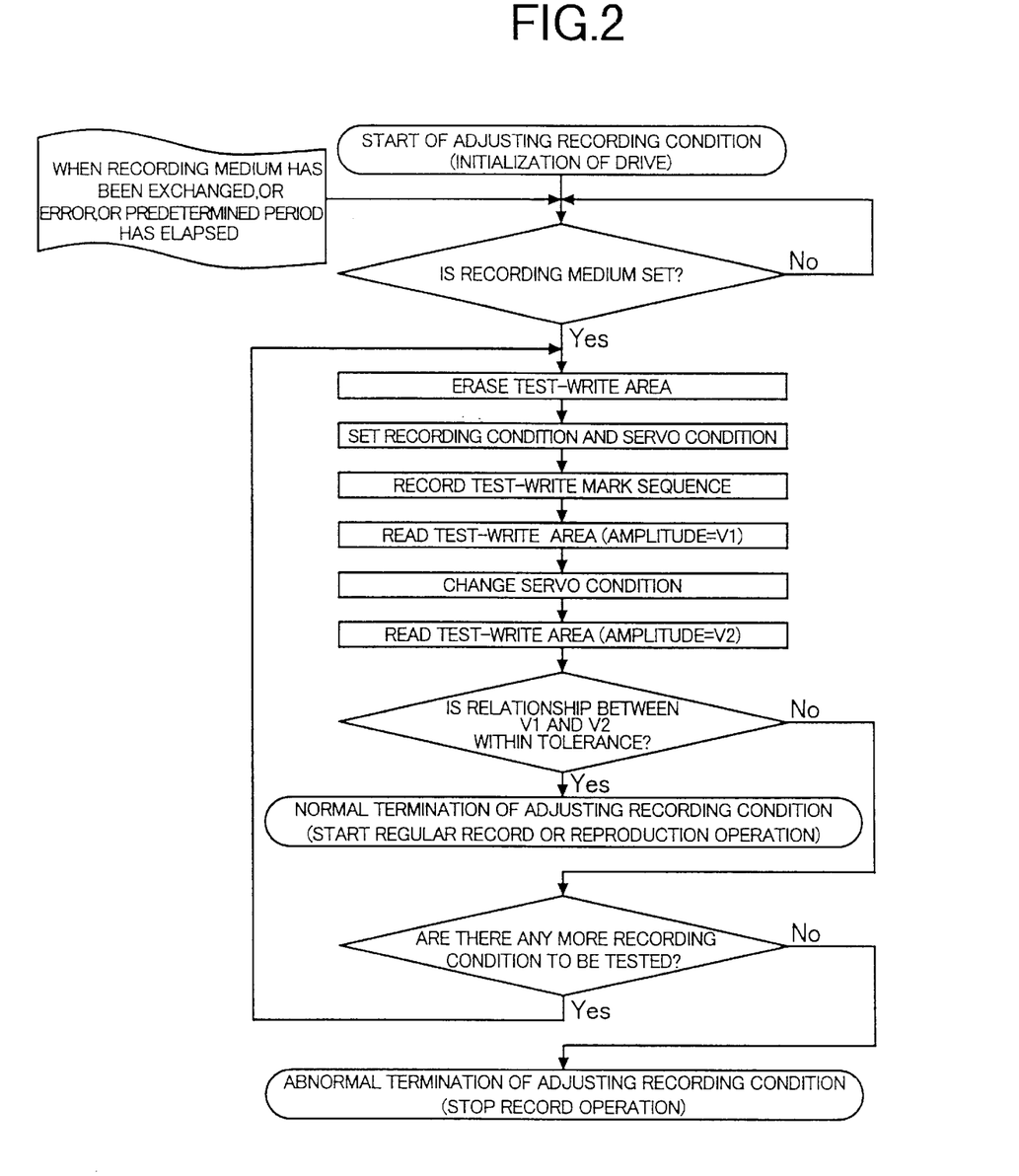
FIG. 2 is a flow chart showing a process of optimizing a recording condition of the information recording apparatus according to the present invention.

FIG. 2 is a flow chart showing a process of optimizing the recording condition of the information recording apparatus according to the present invention. First, after the apparatus is initialized by turning on a power supply, or the like, a judgment is made as to whether a recording medium has been already set in the apparatus or not. If there is no recording medium, the apparatus is still in an idle state. If a recording medium has been already set, the apparatus carries out an operation of optimizing the recording condition continuously. The operation of optimizing the recording condition is also started when the recording medium is exchanged to a new one, when error occurs in recording/reproduction or when a predetermined time is passed after the completion of the recording condition optimizing operation in the previous cycle, as well as when the apparatus is initialized. First, the optical spot is moved to a predetermined test-write zone, the zone is erased, and a recording condition which has been not tried yet is set for the respective portions of the apparatus. Then, a test-write mark sequence is recorded on the erased test-write zone. Immediately after the recording of the test-write mark sequence, the test-write mark sequence is reproduced without any change of the servo condition (focusing displacement from a focus point, tracking displacement from a center track, polarity of tracking or tracking on/off), so that the amplitude of the reproduced signal is measured by the reproduction signal evaluation circuit. Let the amplitude of the reproduced signal be V1 at this time. Then, the servo condition is changed, and the test-write mark sequence is reproduced from the test-write zone again. Let the amplitude of the reproduced signal be V2 at this time. If the relation between the amplitudes V1 and V2 (for example, the ratio of V1 to V2) is within tolerance, the main controller regards the record mark width as being within tolerance and terminates the recording condition optimizing operation normally so that the operation is restored to the recording/reproducing operation of the apparatus itself. If the relation between V1 and V2 is not within tolerance, the main controller searches for any other recording condition to be tried. If any other recording condition has remained yet, the recording condition is changed to it and the operation is returned to the erasion of the test-write zone so that a series of steps is repeated. If any other recording condition to be tried has not remained, the main controller regards the recording medium or the apparatus as being abnormal and terminates the recording condition optimizing operation abnormally while informing the outside of the abnormal termination.

Figure 3:
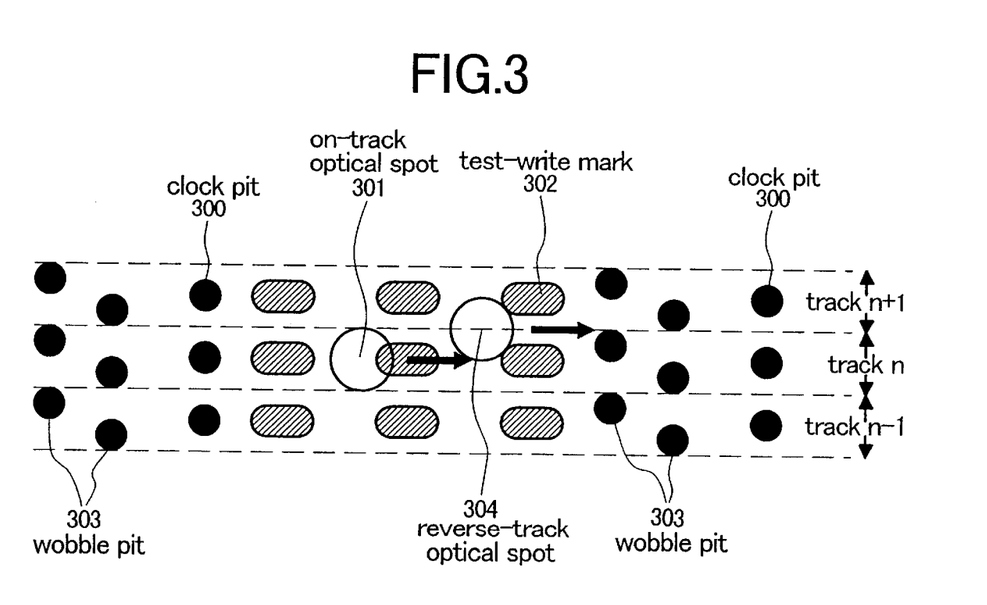
FIG. 3 is a view showing a recording/reproducing method applied to a test-write zone by the apparatus depicted in FIG. 1.

FIG. 3 is a first explanatory view showing an example of recording/reproduction on/from the test-write zone by the apparatus depicted in FIG. 1. Wobble pits 303 for generating a tracking servo signal by a sampled servo method and clock pits 300 for generating a recording/reproducing timing signal are formed at regular angular periods on a disk which is a recording medium. First, in a test-write recording mode, adjacent tracks n−1, n and n+1 are erased and then test-write marks 302 are formed at suitable regular periods in a state in which marks are in phase among the adjacent tracks (marks come side by side with one another and intermark gaps come side by side with one another). Taking into account the necessity of measuring the width of a mark accurately while avoiding timing error between recording and reproduction, timing error between tracks and the influence of leading and trailing edges of the mark at the time of detection of the mark width, it is preferable that the length of a gap (space) between test-write marks 302 as viewed in a tracking direction is not smaller than the diameter of the optical spot and as long as possible. Particularly when a light intensity modulation method is used, there is a possibility that the width of the leading edge of the mark in which accumulation of recording energy is not a converged may be different from the width of the trailing edge of the mark in which accumulation of recording energy is converged. It is also preferable from this point of view that the mark is set to be as long as possible to measure the mark width accurately. Taking into account the frequency characteristic, etc. of the recording/reproducing channel, it is, however, undesirable that a mark/space which is too long for recording/reproducing user data actually is used as the test-write mark 302/space in each track. To sum up, it is most preferable that the longest mark and space allowable in the scope of the conversion rule of the encoder 104 are used as the test-write mark 302 and space in each of tracks n−1 and n+1. When, for example, the conversion rule of the encoder 104 is (1, 7) modulation, and information after conversion is subjected to mark edge recording (NRZI modulation), the length of mark/space used for recording/reproducing user data actually is in a range of from 2 to 8 channel bits. Hence, in this case, it is most preferable that the length of test-write mark 302/space in each track is 8 channel bits. In a test-write recording mode, the optical spot is controlled to scan the center of each track as represented by an on-track optical spot 301. In FIG. 3, each of the arrows denotes the scanning direction and center position of the optical spot. Then, in a test-write evaluation mode, after reproduction is performed in the same servo condition as in the test-write recording mode so that the optical spot scans the center of the track, the servo condition is changed. That is, as represented by a reverse-track optical spot 304, tracking control is performed in reversed polarity so that intertrack reproduction is performed (reverse-track). Although the case of reverse-track reproduction is shown now, the servo condition used may be such that tracking displacement from a track center is applied in the same polarity as that in the recording mode.

Figure 4:
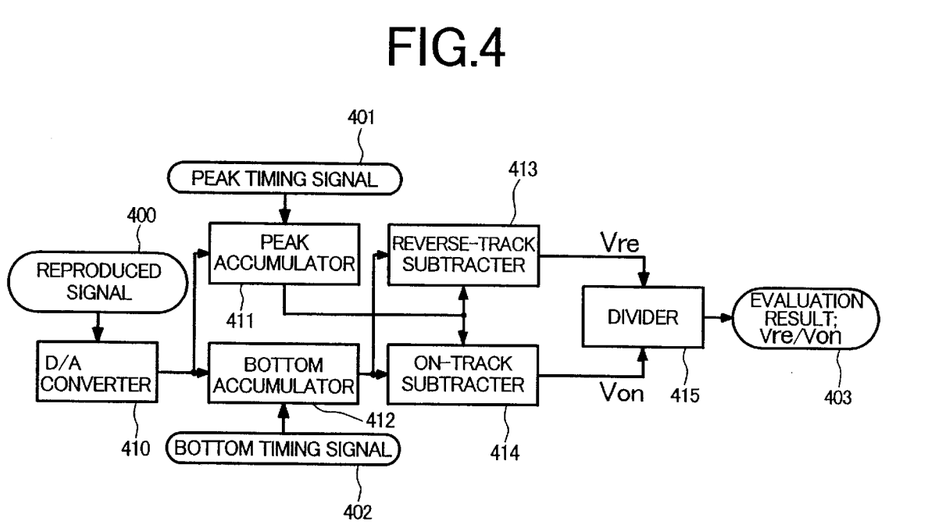
FIG. 4 is a diagram showing an example of the configuration of a reproduced signal evaluation circuit corresponding to FIG. 3.
Figure 5:
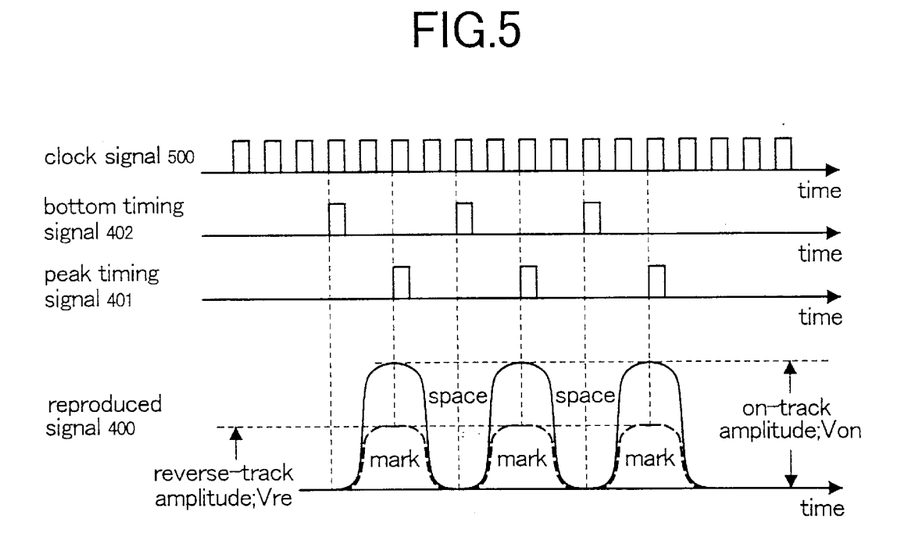
FIG. 5 is a time chart showing the operation of the reproduced signal evaluation circuit depicted in FIG. 4.

FIG. 4 is a diagram showing an example of the configuration of the reproduction signal evaluation circuit corresponding to FIG. 3. FIG. 5 is a time chart showing the operation of the reproduction signal evaluation circuit depicted in FIG. 4. As the whole of the circuit, a clock signal 500 generated by the PLL 112 on the basis of the clock pits 300 is referred to as a reference timing signal for the operation of the circuit. A peak timing signal 401 and a bottom timing signal 402 indicating the center position of the test-write mark 302 and the center position of the space between adjacent test-write marks respectively are generated on the basis of the clock signal 500 and supplied from the PLL 112. First, a reproduced signal 400 such as a reproduced magneto-optical signal is supplied to a D/A converter 410 and digitized therein. An output of the D/A converter 410 is supplied to a peak accumulator 411 and a bottom accumulator 412, so that levels of the output are accumulated on the basis of the peak timing signal 401 and the bottom timing signal 402 respectively. These accumulation processes are used for performing the recording condition optimizing operation more accurately by reducing the influence of noise included in the reproduced signal 400. These accumulation processes can be omitted if the signal-to-noise ratio of the reproduced signal 400 is sufficiently high. Then, outputs of the peak accumulator 411 and the bottom accumulator 412 are supplied to an on-track subtracter 414 and a reverse-track accumulator 413 and converted into the amplitude Von of the reproduced signal at on-track reproduction and the amplitude Vre of the reproduced signal at reverse-track reproduction respectively. Finally, the amplitudes Von and Vre are supplied to a divider 415, so that a calculation result after calculation of the ratio Vre/Von is transmitted as an evaluation result 403 to the main controller.

Figure 6:
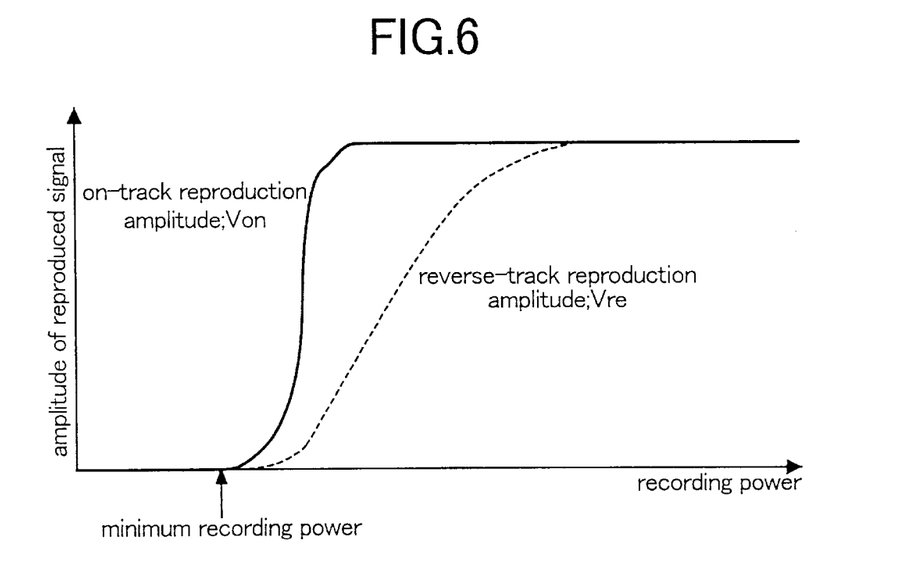
FIG. 6 is a graph showing a reproduced signal evaluation process contained in the recording condition optimizing process explained in FIGS. 3 to 5.

FIG. 6 is a graph showing a reproduction signal evaluation method contained in the recording condition optimizing method as explained above with reference to FIGS. 3 to 5. Recording power is optimized by the recording condition optimizing operation in accordance with the following procedure. That is, on-track reproduction and reverse-track reproduction are performed by use of a test-write zone while changing recording power to thereby detect the amplitude of a reproduced signal on the basis of a test-write mark. The reproduced signal amplitude Von at on-track reproduction begins to increase at recording commencing power and increases continuously as the mark width increases. However, after the mark width becomes approximately equal to the diameter of the optical spot, the amplitude little changes even in the case where recording power is increased. This is because the amplitude Von is the mirror of the mark width. On the other hand, the reproduced signal width Vre at reverse-track reproduction begins to increase gradually at recording commencing power and increases continuously as the mark width increases. However, after marks on adjacent tracks come into contact with each other, the amplitude Vre is saturated with the same saturation value as that of the amplitude Von. This is because the amplitude Vre is the mirror of the distance between marks on adjacent tracks. Hence, if recording is performed with recording power so that the ratio of Vre to Von takes a predetermined value, a mark having a constant width can be formed extremely and accurately. Hence, the distance between adjacent tracks in an optical disk can be reduced, so that the information recording apparatus can be improved in storage capacity and reliability.

Figure 7:
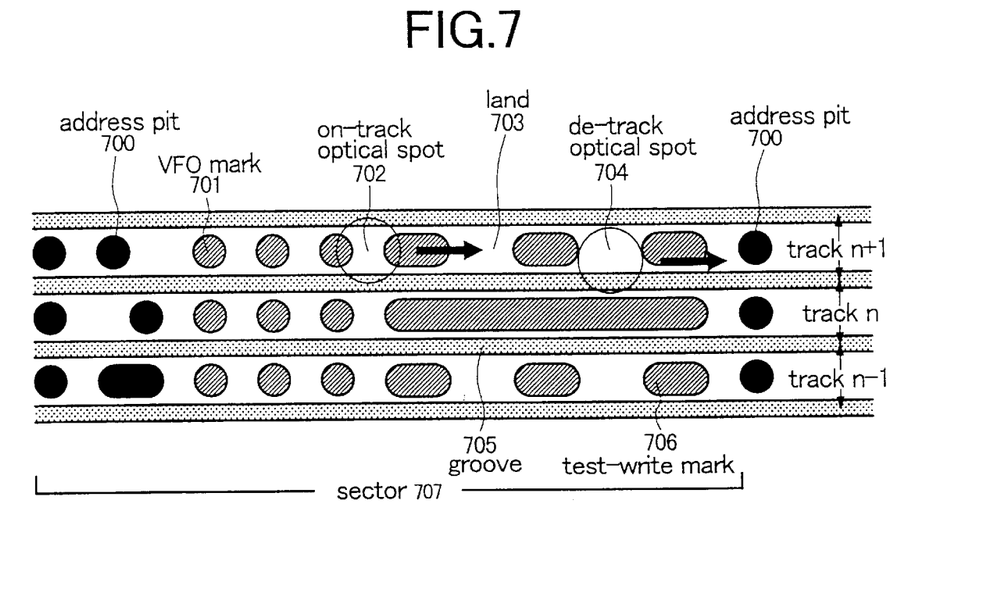
FIG. 7 is a view showing another recording/reproducing method applied to a test-write zone by the apparatus depicted in FIG. 1.

FIG. 7 is a second explanatory view showing another recording/reproducing method applied to the test-write zone by the apparatus explained above with reference to FIG. 1. On a disk which is a recording medium, grooves 705 are formed at regular intervals in a radial direction of the disk so that the grooves 705 divide a surface of the disk into tracks and generate a tracking servo signal by a continuous servo method. Address pits 700 for holding address information are formed at regular intervals in each track, so that each track is further divided into sectors 707 as minimum rewriting units. In a recording mode, VFO marks 701 serving as a recording/reproducing timing reference are formed just after the address pits 700, and user data or test-write marks 706 are formed after the VFO marks 701. First, in a test-write recording mode, adjacent tracks n−1, n and n+1 are erased. Then, test-write marks 706 are formed at suitable regular periods on the tracks n−1 and n+1 whereas a test-write mark 706 sufficiently longer than those in the tracks n−1 and n+1 is formed on the track n. Taking into account the necessity of measuring the mark width accurately while avoiding timing error between recording and reproduction and the influence of leading and trailing edges of each mark at the time of detection of the mark width, it is preferable that the length of each test-write mark 706/ space in the tracks n−1 and n+1 is made to be not smaller than the diameter of the optical spot and as long as possible. Particularly when a light intensity modulation method is used, there is a possibility that the width of the leading edge of the mark in which accumulation of recording energy is not converged may be different from the width of the trailing edge of the mark in which accumulation of recording energy is converged. It is preferable from this point of view that the mark is set to be as long as possible to measure the mark width accurately. Taking into account the frequency characteristic of the recording/reproducing channel, the following response of the PLL for generating a recording/ reproducing timing signal, etc., it is, however, undesirable that a mark/space which is too long for recording/ reproducing user data actually is used as the test-write mark 706/space in each of the tracks n−1 and n+1. To sum up, it is most preferable that the longest mark/space allowable in the scope of the conversion rule of the encoder 104 is used as the test-write mark 706 and space in each of the tracks n−1 and n+1. When, for example, the conversion rule of the encoder 104 is (1, 7) modulation, and information is subjected to mark edge recording (NRZI modulation) after conversion, the length of mark/space to be used for recording/reproducing user data actually is in a range of from 2 to 8 channel bits. Hence, in this case, it is most preferable that the length of test-write mark 706/space in each of the tracks n−1 and n+1 is 8 channel bits. On the other hand, the reason why a mark longer than those in the tracks n−1 and n+1 is recorded on the track n is that the continuous servo method can hardly adjust the recording/reproducing timing between adjacent tracks accurately and can hardly make the marks in phase between adjacent tracks. When the test-write marks 706 on the tracks n+1 and n−1 are the longest marks in the scope of the conversion rule of the encoder 104, the test-write mark on the track n is inevitably out of the conversion rule of the encoder 104. However, because the subject of measurement of the mark width is the test-write marks 706 formed on the tracks n−1 and n+1, that is, because the test-write mark 706 formed on the track n is not the subject of measurement (reproduction), there is no problem even in the case where the test-write mark on the track n violates against the conversion rule of the encoder 104 (even if the test-write mark on the track n exceeds the run-length limitation). This causes no problem in the recording condition optimizing operation. The mark may be rather as long as possible so that the mark extends over the whole of the sector 707. In the test-write recording mode, as represented by the on-track optical spot 702, the optical spot is (on-track) controlled so as to scan the center of each track. In FIG. 7, each of the arrows denotes the scanning direction and center position of the optical spot. Then, in a test-write evaluation mode, after reproduction is performed in the same servo condition as in the test-write recording mode so that the optical spot scans the center of the track n+1 or n−1, the servo condition is changed. That is, as represented by the de-track optical spot 704, scanning is performed by application of tracking displacement in a downward direction in FIG. 7 with reference to the center of the track n+1 (de-track). Although the case of de-track reproduction is shown now, a servo condition of polarity reverse to that in the test-write recording mode may be used.

Figure 8:
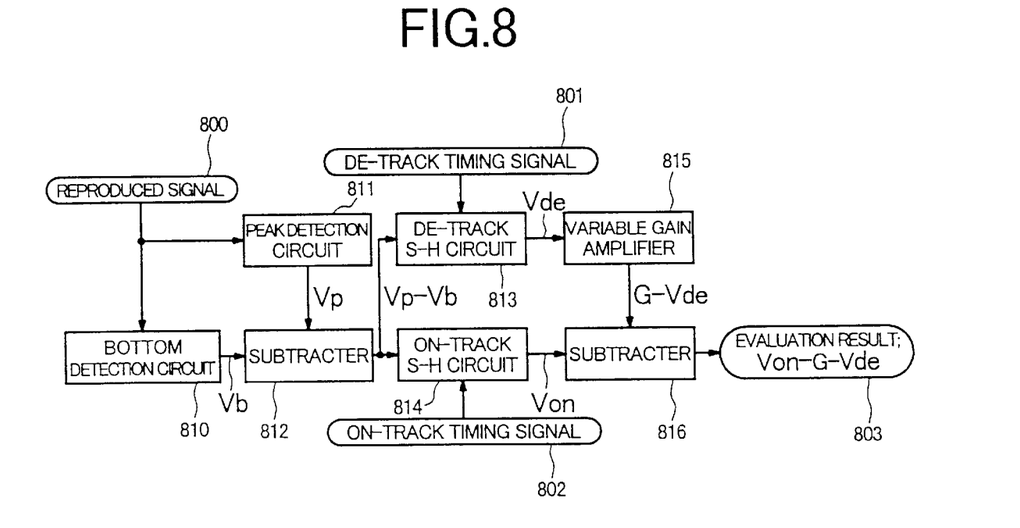
FIG. 8 is a diagram showing an example of the configuration of a reproduced signal evaluation circuit corresponding to FIG. 7.
Figure 9:
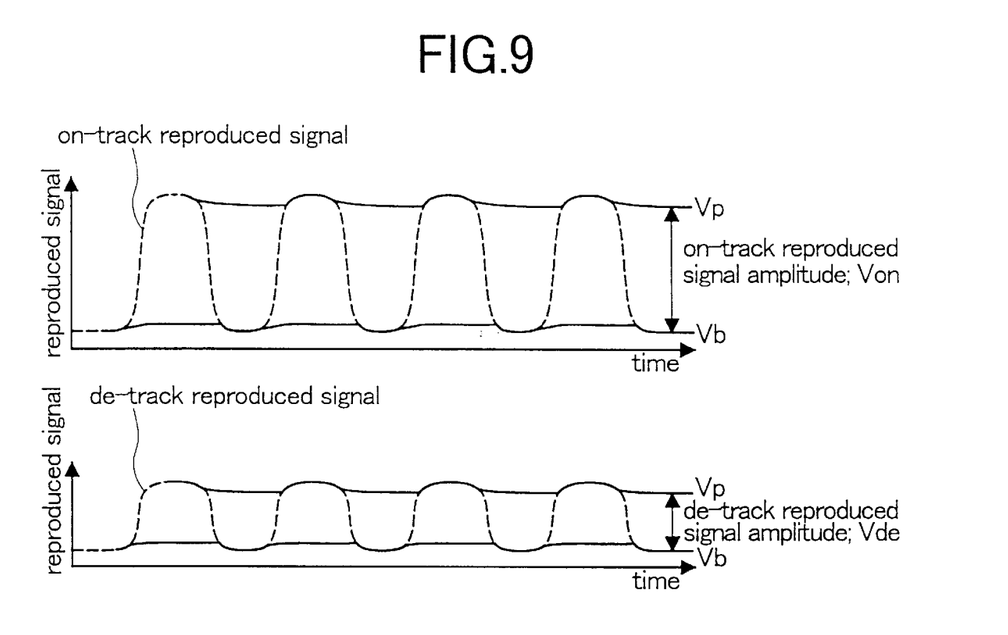
FIG. 9 is a diagram showing the operation of the reproduced signal evaluation circuit depicted in FIG. 8.

FIG. 8 is a diagram showing an example of the configuration of a reproduction signal evaluation circuit corresponding to FIG. 7. FIG. 9 is a diagram showing the operation of the reproduction signal evaluation circuit depicted in FIG. 8. First, a reproduced signal 800 such as a reproduced magneto-optical signal is given to a peak detection circuit 811 and a bottom detection circuit 810, and converted into a peak envelope signal Vp and a bottom envelope signal Vb. The signals Vp and Vb are given to a subtracter 812. The subtracter 812 gives the amplitude difference Vp−Vb of the reproduced signal to an on-track S-H (sample-hold) circuit 814 and a de-track S-H circuit 813. In the on-track S-H circuit 814 and the de-track S-H circuit 813, the amplitude difference Vp−Vb obtained from the on-track reproduced signal and the amplitude difference obtained from the de-track reproduced signal are held with reference to an on-track timing signal 802 and a de-track timing signal 801, respectively. The on-track S-H circuit 814 and the de-track S-H circuit 813 output the amplitude Von of the on-track reproduced signal and the amplitude Vde of the de-track reproduced signal, respectively. The on-track timing signal 802 is a reference timing signal indicating the course of on-track reproduction. The de-track timing signal 801 is a reference timing signal indicating the course of de-track reproduction. Each of the two timing signals 802 and 801 is issued from the main controller 103. The amplitude Vde is amplified by a predetermined gain G by a variable gain amplifier 815, and then the amplitudes G·Vde and Von are given to a subtracter 816. The subtracter 816 calculates the difference Von−G·Vde, so that a calculation result is transmitted as a test-write evaluation result 803 to the main controller. If recording is performed by use of recording power which is such that the ratio of Von to Vde takes a predetermined value G, that is, which is such that the difference value Von−G·Vde becomes zero, in the same manner as in FIG. 6, a mark having a constant width can be formed extremely accurately. Hence, the distance between adjacent tracks of an optical disk can be reduced, so that the information recording apparatus can be improved in storage capacity and reliability.

Figure 10:
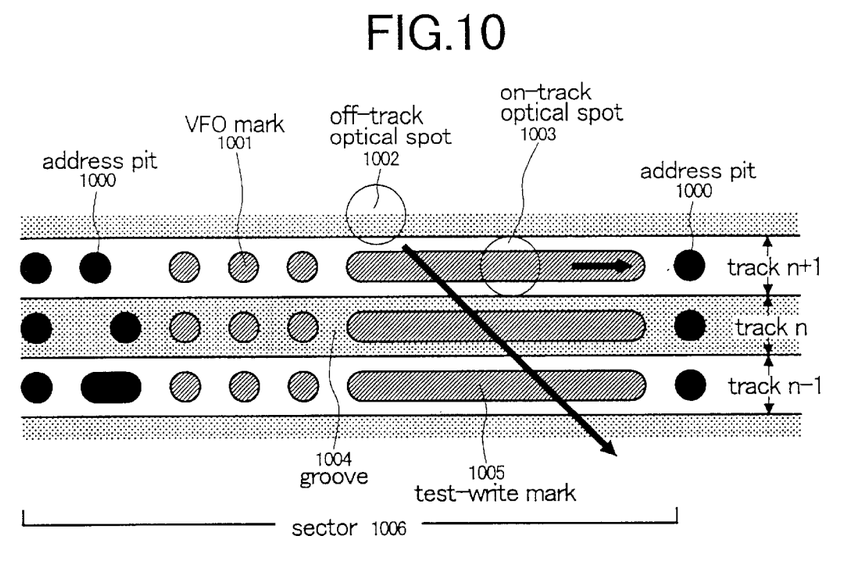
FIG. 10 is a view showing a further recording/ reproducing method applied to a test-write zone by the apparatus depicted in FIG. 1.

FIG. 10 is a third explanatory view showing a further recording/reproducing method applied to the test-write zone by the apparatus explained above with reference to FIG. 1. On a disk which is a recording medium, grooves 1004 are formed at regular intervals in a radial direction of the disk so that the grooves 1004 divide a surface of the disk into tracks and generate a tracking servo signal by a continuous servo method. Address pits 1000 for holding address information are formed at regular intervals in each track, so that each track is further divided into sectors 1006 as minimum rewriting units. In a recording mode, VFO marks 1001 serving as a recording/reproducing timing reference are formed just after the address pits 1000, and user data or test-write marks 1005 are formed after the VFO marks 1001. First, in a test-write recording mode, adjacent tracks n−1, n and n+1 are erased. Then, a test-write mark 1005 is formed on each track so as to be over the whole of a sector 1006. The test-write mark 1005 formed on each track may violate the conversion rule of the encoder 104 (that is, the test-write mark 1005 may exceed the run-length limitation). This is no problem for the recording condition optimizing operation. It is rather preferable that the mark is as long as possible so that the mark extends over the whole of the sector 1006. In the test-write recording mode, the optical spot is (on-track)

controlled to scan the center of each track as represented by the on-track optical spot 1003. In FIG. 10, each of the arrows denotes the scanning direction and center position of the optical spot. Then, in a test-write evaluation mode, after reproduction is performed in the same servo condition as in the test-write recording mode so that the optical spot scans the center of the track, (off-track) reproduction is performed while tracking control is stopped so that the optical spot performs scanning across tracks. Although the case of off-track reproduction is shown now, vibration control may be performed so that the optical spot makes a reciprocating motion across tracks in a direction perpendicular to the track in addition to scanning (main scanning) in the tracking direction.

Figure 11:
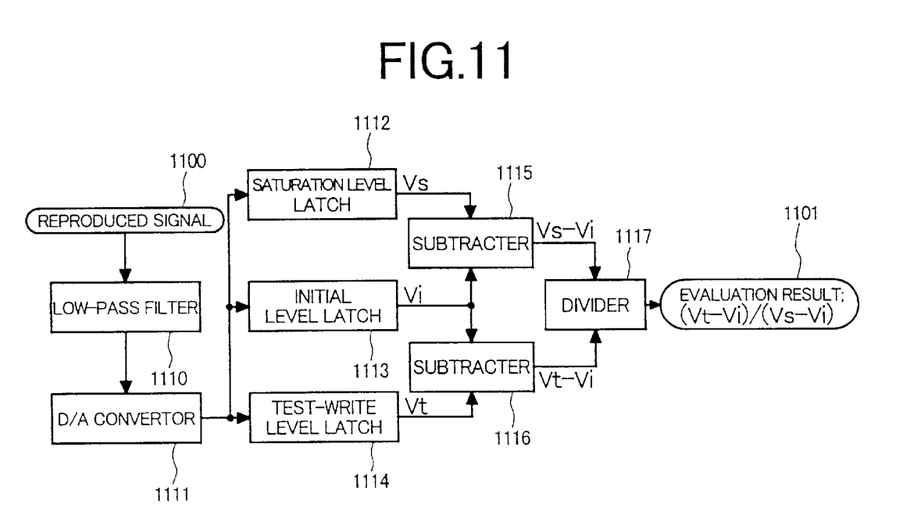
FIG. 11 is a diagram showing an example of the configuration of a reproduced signal evaluation circuit corresponding to FIG. 10.
Figure 12:
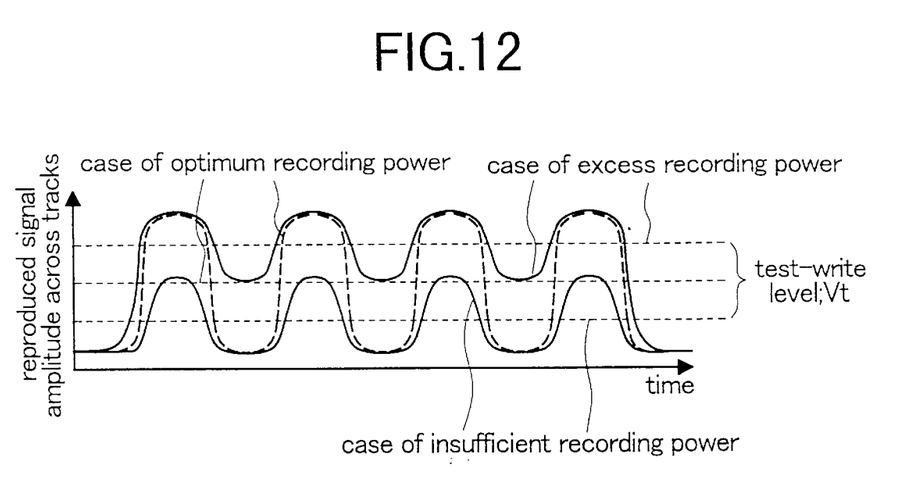
FIG. 12 is a diagram showing the operation of the reproduced signal evaluation circuit depicted in FIG. 12.

FIG. 11 is a diagram showing an example of the configuration of a reproduction signal evaluation circuit corresponding to FIG. 10. FIG. 12 is a diagram showing the operation of the reproduction signal evaluation circuit depicted in FIG. 11. First, after a high-frequency component is removed by a low pass filter 1110, a reproduced signal 1100 such as a reproduced magneto-optical signal is supplied to a D/A converter 1111 and digitized therein. An output of the D/A converter 1111 is supplied to a saturation level latch 1112, an initial level latch 1113 and a test-write level latch 1114. The saturation level latch 1112 holds the reproduced signal average level Vs in the case of on-track reproduction of the test-write mark 1005. The initial level latch 1113 holds the reproduced signal average level Vi in the case of on-track reproduction on the initialized test-write zone. The test-write level latch 1114 holds the reproduced signal average level Vt in the case where reproduction is performed so that the optical spot performs scanning across tracks. The outputs Vs, Vi and Vt of the respective level latches 1112, 1113 and 1114 are supplied to subtracters 1115 and 1116, so that differences Vs−Vi and Vt−Vi are calculated by the subtracters 1115 and 1116, respectively. Then, these calculation results are given to a divider 1117, so that the ratio (Vt−Vi)/(Vs−Vi) is finally calculated. The calculation result is transmitted as an evaluation result to the main controller.

Figure 13:
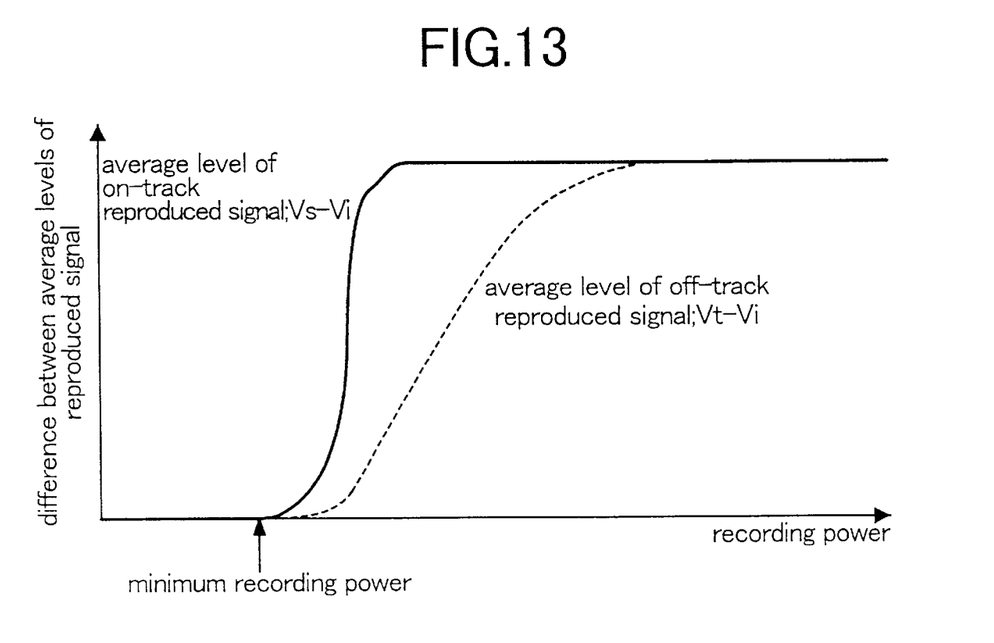
FIG. 13 is a graph showing a reproduced signal evaluation process contained in the recording condition optimizing process explained in FIGS. 10 to 12.

FIG. 13 is a graph showing a reproduction signal evaluation method included in the recording condition optimizing method explained above with reference to FIGS. 10 to 12. Recording power is optimized by the recording condition optimizing operation in accordance with the following procedure. That is, on-track reproduction and off-track reproduction are performed by use of the test-write zone while recording power is changed, so that average levels Vs, Vi and Vt of signals reproduced from the test-write mark are detected. The difference Vs−Vi equivalent to the signal amplitude in the case of on-track reproduction begins to increase at recording commencing power and increases continuously as the mark width increases. However, after the mark width becomes approximately equal to the diameter of the optical spot, the amplitude little changes even if the recording power is increased. This is because the difference value Vs−Vi is the mirror of the mark width. On the other hand, the average level Vt in the case of off-track reproduction begins to increase gradually from the initial value Vi at recording commencing power and increases as the mark width increases. However, after marks on adjacent tracks come into contact with each other, the level Vt is saturated with the same value as the level Vs. This is because the difference value Vt−Vi is the mirror of the distance between marks on adjacent tracks. Hence, if recording is performed with recording power which is such that the ratio of Vt−Vi to Vs−Vi takes a predetermined value, a mark having a constant width can be formed extremely accurately. Hence, the distance between adjacent tracks of an optical disk can be reduced, so that the information recording apparatus can be improved in storage capacity and reliability.

Figure 14:
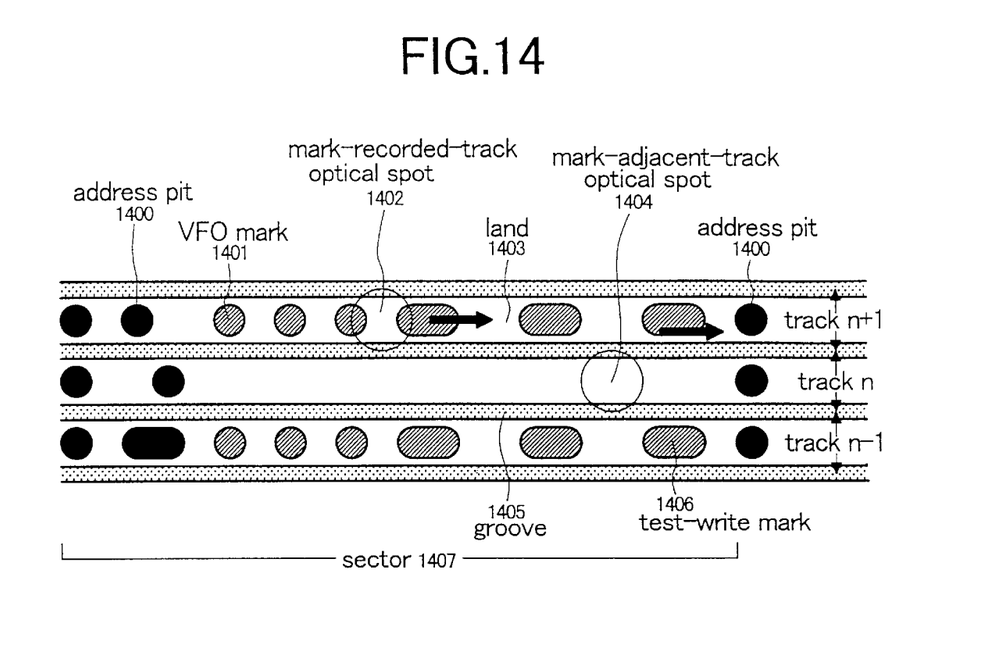
FIG. 14 is a view showing a further recording/ reproducing method applied to a test-write zone by the apparatus depicted in FIG. 1.

FIG. 14 is a fourth explanatory view showing a further recording/reproducing method applied to the test-write zone by the apparatus explained above with reference to FIG. 1. On a disk which is a recording medium, grooves 1405 are formed at regular intervals in a radial direction of the disk. The grooves 1405 are used to divide a surface of the disk into tracks and generate a tracking servo signal by a continuous servo method. Address pits 1400 for holding address information are formed at regular intervals in each track, so that each track is divided into sectors 1407 as minimum rewriting units. In a recording mode, VFO marks 1401 serving as a recording/reproducing timing reference are formed just after the address pits 1400, and user data or test-write marks 1406 are formed after the VFO marks 1401. In a test-write recording mode, adjacent tracks n−1, n and n+1 are first erased and then test-write marks 1406 are formed at suitable periods on tracks n−1 and n+1. Taking into account the necessity of measuring the mark width accurately while avoiding timing error between recording and reproduction and the influence of leading and trailing edges of each mark at the time of detection of the mark, it is preferable that the length of each test-write mark 1406/space in the tracks n−1 and n+1 is made to be not smaller than the diameter of the optical spot and as larger as possible. Particularly when a light intensity modulation method is used, there is a possibility that the width of the leading edge of the mark in which accumulation of recording energy is not converged is different from the width of the trailing edge of the mark in which accumulation of recording energy is converged. It is preferable from this point of view that the mark is set to be as long as possible to measure the mark width accurately. Taking into account the frequency characteristic of the recording/reproducing channel, the following response of the PLL for generating a recording/reproducing timing signal, etc., it is, however, undesirable that a mark/space which is too long for recording/reproducing user data actually is used as the test-write mark 1406/space in the tracks n−1 and n+1. To sum up, hence, it is most preferable that the longest mark/space allowable in the scope of the conversion rule of the encoder 104 is used as the test-write mark 1406 and space in the tracks n−1 and n+1. When, for example, the conversion rule of the encoder 104 is (1, 7) modulation, and information is subjected to mark edge recording (NRZI modulation) after conversion, the length of mark/space to be used for recording/reproducing user data actually is in a range of from 2 to 8 channel bits. Hence, in this case, it is most preferable that the length of test-write mark 1406/space in each of the tracks n−1 and n+1 is 8 channel bits. In the test-write recording mode, the optical spot is controlled to scan the center of each track as represented by the mark-recorded-track optical spot 1402. In FIG. 14, each of the arrows denotes the scanning direction and center position of the optical spot. Then, in a test-write evaluation mode, after reproduction is performed in the same servo condition as in the test-write recording mode so that the optical spot scans the center of the track n−1 or n+1, the servo condition is changed. That is, optical spot scans the center of the track n as represented by the mark-adjacent-track optical spot 1404.

Figure 15:
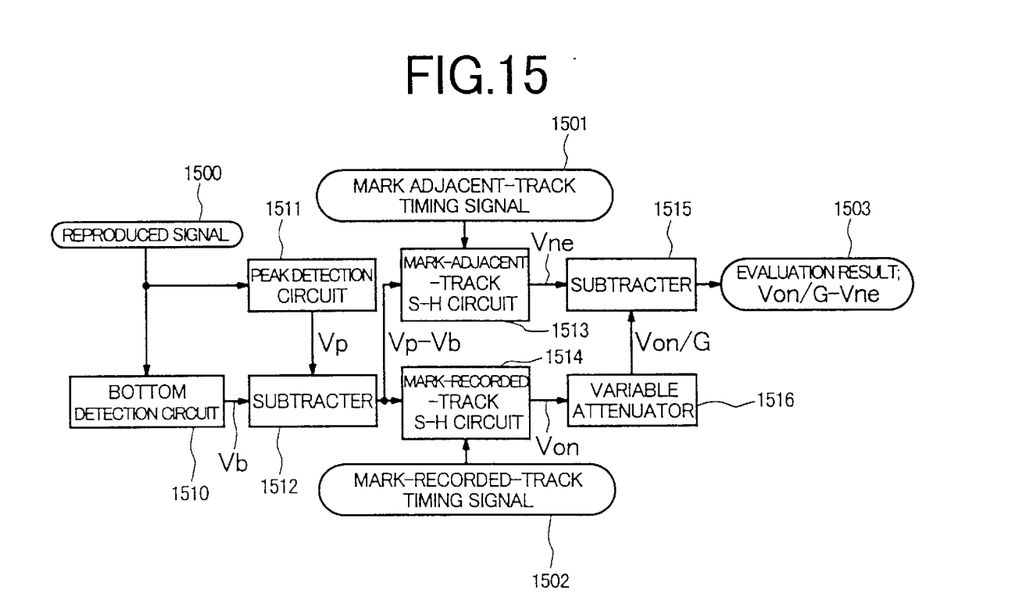
FIG. 15 is a diagram showing an example of the configuration of a reproduced signal evaluation circuit corresponding to FIG. 14.
Figure 16:
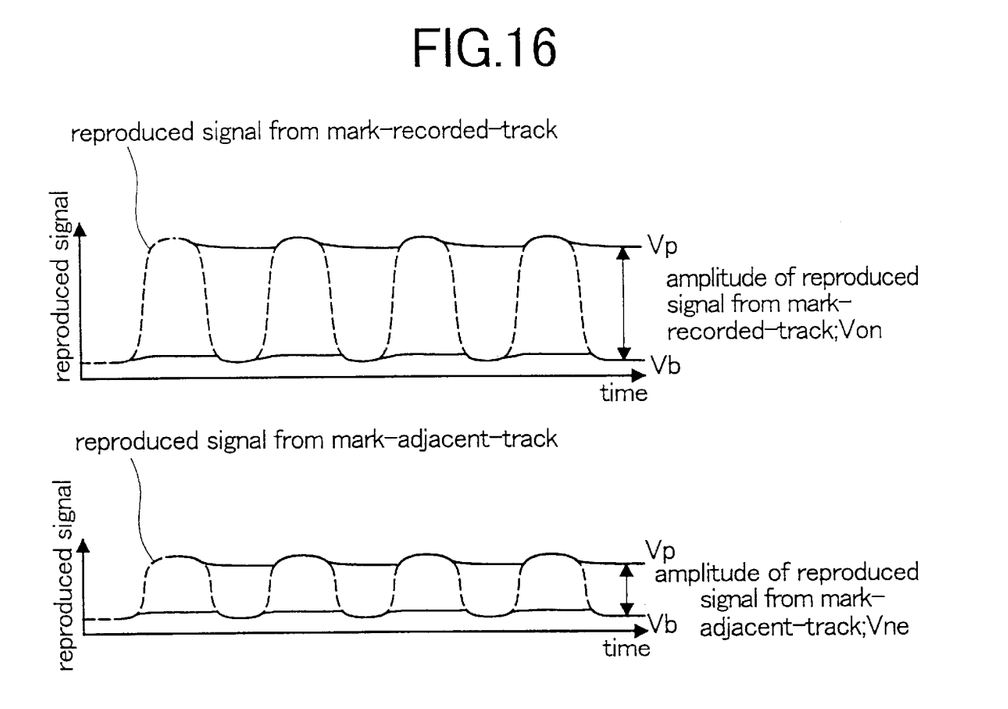
FIG. 16 is a diagram showing the operation of the reproduced signal evaluation circuit depicted in FIG. 15.

FIG. 15 is a diagram showing an example of the configuration of a reproduction signal evaluation circuit corresponding to FIG. 14. FIG. 16 is a diagram showing the operation of the reproduction signal evaluation circuit depicted in FIG. 15. First, a reproduced signal 1500 such as a reproduced magneto-optical signal is supplied to a peak detection circuit 1511 and a bottom detection circuit 1510, and converted into a peak envelope signal Vp and a bottom envelope signal Vb. The signals Vp and Vb are supplied to a subtracter 1512 to form a reproduced signal amplitude Vp−Vb. The value Vp−Vb is supplied to a mark-recorded-track S-H circuit 1514 and a mark-adjacent-track S-H circuit 1513. In the mark-recorded-track S-H circuit 1514 and the mark-adjacent-track S-H circuit 1513, the value Vp−Vb obtained from the reproduced signal in the case of reproduction from a track having recorded test-write marks 1406 and the value Vp−Vb obtained from the reproduced signal in the case of reproduction from a track adjacent to the test-write marks 1406 are held with reference to the mark-recorded-track timing signal 1502 and the mark-adjacent-track timing signal 1501, respectively. The mark-recorded-track S-H circuit 1514 and the mark-adjacent-track S-H circuit 1513 output the reproduced signal amplitude Von in the case of reproduction from the track having the recorded test-write marks 1406 and the reproduced signal amplitude Vne in the case of reproduction from the track adjacent to the test-write marks 1406, respectively. The mark-recorded-track timing signal 1502 is a reference timing signal indicating reproduction from a track having recorded test-write marks 1406. The mark-adjacent-track timing signal 1501 is a reference timing signal indicating reproduction from a track adjacent to the test-write marks 1406. The two reference timing signals are issued from the main controller 103. After the amplitude Von is attenuated by a predetermined attenuation factor G by a variable attenuator 1516, the values Von/G and Vne are given to a subtracter 1515. The subtracter 1515 calculates the difference Von/G-Vne. The calculation result is transmitted as a test-write evaluation result 1503 to the main controller. If recording is performed with recording power which is such that the ratio of Von to Vne takes a predetermined value, that is, which is such that the difference value Von/G-Vne becomes zero, a mark having a constant width can be formed extremely accurately. Hence, the distance between adjacent tracks of an optical disk can be reduced, so that the information recording apparatus can be improved in storage capacity and reliability.

Furthermore, this invention does not intend to limit the recording method, and gist of the present invention is also effective for an information recording apparatus based on not only so-called "light intensity modulation method", but also so-called "magnetic field modulation method" or "laser-strobe magnetic field modulation method."

According to the present invention, in an information recording apparatus for recording information by irradiation of energy to a recording medium to cause a local physical change in the recording medium, marks carrying information can be formed to a desired shape which is neither too large nor too small. Hence, it becomes unnecessary to secure the margin of the track width for increase of crosstalk and cross-erase. Hence, the distance between adjacent tracks can be reduced, so that recording surface density can be enhanced. At the same time, high reliability of the recording/reproducing operation is achieved, so that the size of the information recording apparatus and the size of the recording medium can be reduced. Hence, it is advantageous in terms of cost.

What is claimed is:

1. An information recording apparatus for recording information on a recording medium by supplying said recording medium with energy to form marks different in physical property from non-recorded portions, comprising:

an energy generation device for generating recording energy;

a position control device for controlling a position of supply to said recording medium with an output of said energy generation device;

a drive device for driving said energy generation device;

a switching device for switching information based on user data and test information to supply these two kinds of information selectively to said drive device a reading device for reading said marks recorded on said recording device;

an evaluation device for evaluating a reproduced signal obtained by said reading device; and a recording condition control device for controlling a recording condition on the basis of an evaluation result obtained by said evaluation device, wherein, when said marks used for recording said test information are to be reproduced, controlling operation of said position control device is changed to be different from that used for recording said test information.

2. An information recording apparatus according to claim 1, wherein a substance of the controlling operation of said position control device required to be changed is displacement of tracking of said position control device from a tracking center.

3. An information recording apparatus according to claim 1, wherein a substance of the controlling operation of said position control device required to be changed is polarity of tracking of said position control device.

4. An information recording apparatus according to claim 1, wherein a substance of the controlling operation of said position control device required to be changed is stop or start of a tracking operation of said position control device.

5. An information recording apparatus according to claim 1, wherein a substance of the controlling operation of said position control device required to be changed is a track which a target for said position control device.

6. An information recording apparatus for recording information on a recording medium by supplying said recording medium with energy to form marks different in physical property from non-recorded portions, comprising:

an energy generation device for generating recording energy;

a position control device for controlling a position of irradiation on said recording medium with an output of said energy generation device;

a drive device for driving said energy generation device;

a switching device for switching information based on user data and test information to supply the two kinds of information selectively to said drive device;

a reading device for reading said marks recorded on said recording medium;

an evaluation device for evaluating a reproduced signal obtained by said reading device; and a recording condition control device for controlling a recording condition on the basis of an evaluation result obtained by said evaluation device, wherein, when said test information is supplied to said drive device so as to be recorded, in-phase mark sequences are recorded on adjacent tracks respectively.

* * * * *

UNITED STATES PATENT AND TRADEMARK OFFICE
CERTIFICATE OF CORRECTION

PATENT NO. : 6,678,220 B1
DATED : January 13, 2004
INVENTOR(S) : Hideki Saga

It is certified that error appears in the above-identified patent and that said Letters Patent is hereby corrected as shown below:

Column 1,
Line 67, change "is direct to solve" to -- is a way to solve --

Column 5,
Line 14, change "data 105 which is user data" to -- data 105 by which user data --

Column 14,
Line 40, change "which a target" to -- which is a target --

Signed and Sealed this

Seventeenth Day of August, 2004

JON W. DUDAS
*Acting Director of the United States Patent and Trademark Office*